United States Patent Office 3,660,331
Patented May 2, 1972

---

3,660,331
VINYL HALIDE RESINS STABILIZED WITH TETRAHYDROPYRANYL ESTERS AND ETHERS
Jerome H. Ludwig, Shaker Heights, Ohio, assignor to Emery Industries, Inc., Cincinnati, Ohio
No Drawing. Continuation-in-part of application Ser. No. 695,570, Jan. 4, 1968. This application Apr. 29, 1970 Ser. No. 33,048
Int. Cl. C08f 45/58
U.S. Cl. 260—23 XA        17 Claims

ABSTRACT OF THE DISCLOSURE

Stabilization of vinyl halide and vinyl halide copolymer resin compositions against degradation by heat and the like by incorporating therein tetrahydropyranyl ethers or esters.

Vinyl halide resin stabilized compositions containing tetrahydropyranyl ethers or esters are employed in combination with metallic soaps, epoxidized fatty compounds, organic chelators and plasticizers. Effective and even synergistic stabilizing activities are demonstrated by the disclosed compositions.

---

RELATED APPLICATIONS

This application is a continuation-in-part of Ser. No. 695,570 filed Jan. 4, 1968, entitled "Vinyl Halide Resins Stabilized With Tetrahydropyranyl Esters and Ethers," now abandoned.

BACKGROUND OF INVENTION (1) Field of invention

This invention relates to the field of stabilized vinyl halide resin compositions and more particularly to vinyl halide resins stabilized with tetrahydropyran esters or ethers.

(2) Prior art

The practical importance of vinyl halide resin stabilization can best be appreciated by briefly referring to some of the well-known drawbacks of inadequate stabilization. Plastic seat covers, raincoats, packaging materials and all sorts of finished products made from vinyl halide resin compositions degrade in use unless adequately stabilized. One of the primary indications of degradation is discoloration which is usually enhanced by the action of heat, oxygen, sunlight and other natural elements. Also, in order to produce plastic finished products of the type mentioned from vinyl halide resin compositions, the compositions must be capable of being worked or molded under the action of heat and oxygen. Unstabilized vinyl halide resins have the tendency to degrade under such processing conditions even before the article is finished. In short, stabilization of vinyl halide plastics is important and the problems associated with stabilization have received comprehensive attention.

As concerns particular background for this invention, stabilization of vinyl halide resins with tetrahydropyran derivatives and metal salts has been suggested, for example, in U.S. Pat. 3,233,660. According to this patent, vinyl halide resin compositions have been stabilized against heat degradation by incorporating therein certain metal salts and tetrahydropyrans containing at least two free hydroxyl groups. It has also been suggested that a tetrahydropyran nucleus substituted with an epoxy group containing substituent tends to act as a stabilizer for polyvinyl chloride.

These proposals are representative of what has heretofore been felt necessary in tetrahydropyran derivatives to permit them to provide some degree of stabilization of vinyl halide resins. Specifically, the presence of such groups as free hydroxyls or epoxy group containing substituents on the tetrahydropyran nucleus heretofore have been understood to be required.

SUMMARY OF INVENTION

This invention is predicated in part upon the discovery that halogen containing vinyl resins can be effectively stabilized with a general class of tetrahydropyranyl ethers and esters which do not have free hydroxyl groups or epoxy group containing substituents on the tetrahydropyran nucleus. Heat stable vinyl halide resin compositions are provided according to this invention by including therein tetrahydropyrans corresponding to the formula:

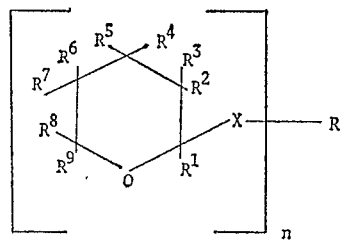

wherein X is a divalent atom representing either oxygen or sulfur;
wherein $R^1$ to $R^9$ represent either hydrogen or lower alkyl;
wherein when $n$ is 1, R may be selected from the group consisting of alkyl, aryl, cycloalkyl, alkaryl, aralkyl, haloaryl, nitroaryl, alkoxyaryl, hydroxyaryl, alkylcarbonyl, arylcarbonyl, alkarylcarbonyl, alkenecarbonyl, aralkylcarbonyl, and di(hydroxyaryl)alkylenecarbonyl;
wherein when $n$ represents a whole number from 2 to about 3, inclusive, R may be selected from the group consisting of alkylene, phenylene, alkylene diaryl, a radical derived from diphenolic acid, alkylenedicarbonyl, and alkenyltricarbonyl.

The precise mechanism by which vinyl halide resin stabilization occurs in the compositions of this invention is not completely understood. However, empirical results have demonstrated that visible discoloration upon heating in air which is the principal indication of resin degradation is prevented or suppressed in compositions of this invention. This advantageous property permits vinyl halide resins to be worked under the action of heat, and oxygen into many useful forms of the type mentioned above without degradation during processing or thereafter upon exposure to heat and oxygen.

The stabilized character of vinyl compositions and the tetrahydropyranyl ethers and esters as herein defined is surprising in view of the fact that, unlike free hydroxy or epoxy group containing substituents on the tetrahydropyran nucleus, the oxygen or sulfur atom of the —XR group of the above formula is bonded directly to the tetrahydropyran nucleus. Yet, this molecular structure provides a "built-in" uniqueness which operates when needed to counter vinyl halide resin degradation. It is theorized that the actual stabilization mechanism occurs by using to advantage a "reversibility" property of the ethers and esters. In the presence of the hydrogen halide, which is formed upon vinyl halide resin degradation, the tetrahydropyran esters and ethers of this invention revert to free dihydropyran and acids or alcohols. The free dihydropyran is then available to absorb hydrogen halide and prevent discoloration or degradation of the vinyl resin.

In a presently preferred form, the vinyl halide resin compositions of this invention include tetrahydropyranyl ethers such as 2-nonylphenoxy-tetrahydropyran; 2-octylphenoxytetrahydropyran; 2[4-(hydroxyphenylisopropylidene) phenoxy] tetrahydropyran and 2[4-[4-(2-tetrahydropyranyloxy)-phenyl] isopropylidenephenoxy]tetrahydropyran, i.e., the diether adduct of dihydropyran and "Bisphenol-A." Compounds of this type are preferred at present for a number of reasons. First, it has been determined that when employed alone, even at lower levels of about 1 to about 3 parts by weight per 100 parts by weight of vinyl resin, they generally outperform the majority of other ethers and esters defined by the general formula previously mentioned for the tetrahydropyrans used according to this invention. Second, these tetrahydropyranyl ethers have been demonstrated to synergistically behave as stabilizers with certain metallic salts containing both barium and cadmium cations.

This synergism has been found to exist even at about 0.1–45 parts by weight of the ether per 100 parts by weight resin and where the mentioned metallic salts are present in an amount in the range of about 1–2 parts by weight, for example. Third, these ethers are capable of superior activity at low concentrations. Among other reasons which will become more apparent later in this description, these tetrahydropyranyl ethers are of particular interest because of the commercial availability of starting materials.

The stabilizers of this invention have been found to outperform as heat stabilizers the popularly used epoxidized oils such as epoxy soya by as much as 40 to 1 on a weight basis. That is, only $\frac{1}{40}$ as much dihydropyran derivative is required as epoxy soya when both are used in the presence of Ba/Cd stabilizers.

When it is desirable to employ an epoxy stabilizer, the stabilizers used in this invention can be beneficially used with the epoxidized fatty compounds. The dihydropyran derivative stabilizers are compatible with epoxy stabilizers because they are free of active hydrogen which would would react with epoxidized oils. Use of the combination of epoxy stabilizers and dihydropyran derivatives described herein has in part been found to produce a synergistic stabilizing effect on vinyl halide resins. This effect occurs even in the absence of metal stabilizers. A derivative of the general formula, supra, particularly 2[4-[4-(2-tetrahydropyranyl)-phenyl] isopropylidenephenoxy] tetrahydropyran, has proved effective in amounts as low as about 0.2 part per about 1–8 parts of epoxidized soya bean oil, both based upon 100 parts resin.

Particularly good stabilizing results have also been achieved using the thiol derivatives of dihydropyran and the vinyl halide resin compositions containing these thiol derivatives represent another preferred form of this invention. Specific examples of thiol derivatives include octyl 2-tetrahydropyran sulfide and dodecyl-2-tetrahydropyran sulfide.

Various amounts of the tetrahydropyranyl ether and ester stabilizers can be incorporated into the vinyl halide resins for stabilization. Even as much as 200 parts of the stabilizer per 100 parts of resin can be used. Generally, from about 1 to about 10 parts by weight per 100 parts by weight of vinyl resin have been found an acceptable proportion for the general class of compounds. It has been observed that as the amount of stabilizer is increased up to and above 10 parts, stability decreases in some cases. This indicates in these cases that it is beneficial to add a smaller amount of stabilizer. As mentioned, certain of the stabilizers can be varied over a range of from about 0.2 to about 45 parts per 100 parts by weight when used with metallic soaps or epoxidized stabilizers.

The halogen containing resins which can be stabilized according to this invention include vinyl halide resins. The term vinyl halide resin has been used herein to identify polymers and resins derived by homopolymerization or copolymerization of vinyl or vinylidene halide, such as chloride or bromide, with each other or with vinyl acetate and other different monomers. Polyvinyl chloride and copolymers of polyvinyl chloride and vinyl acetate containing about 13% vinyl acetate are exemplary of these resins.

The tetrahydropyranyl ethers and esters of this invention are prepared by reaction of dihydropyran with the corresponding alcohol, phenol, acid or phenol-acid according to techniques which are hereinafter detailed. Also, it is to be understood that polyfunctional alcohols, phenolic, and/or acidic reactants can produce mono,- di-, tri-, etc. adducts of dihydropyran or mixtures thereof depending upon the molar ratios of the reactants and conditions.

Specific examples of the alkyl tetrahydropyranyl ethers include the reaction product of dihydropyran and an aliphatic alcohol exemplified by dodecanol, hexadecanol, mixtures of straight chain and branched chain higher aliphatic alcohols of up to $C_{20}$–$C_{22}$, methylphenyl carbinol, 2,6 dimethyl-4-heptanol, 2-cyclohexyl cyclohexanol and the like.

Specific examples of suitable tetrahydropyranyl ethers include the reaction product of dihydropyran and a phenolic derivative exemplified by resorcinol, 4,4 isopropylidenediphenol, nonylphenol, octylphenol, phenol, o-cresol, p-nitrophenol, p-methoxyphenol, trichlorophenol, polyisobutylphenol, B-naphthol, catechol, hydroquinone and the like.

Specific examples of tetrahydropyranyl esters or etheresters include the reaction product of dihydropyran and aliphatic or aromatic carboxylic acids or substituted acids exemplified by:

Pelargonic, structurally modified $C_{18}$ acids [1], stearic, Dimer [2], Trimer [3], neodecanoic, benzoic, adipic, diphenolic [4], tallow, and azelaic.

Specific examples of the thio-dihydropyran derivatives include the reaction product of dihydropyran and an aliphatic or aromatic thio as follows: dodecanethiol, thiophenol, thiobenzoic and octanethiol.

The preparation of dihydropyran to obtain starting material for the production of the above dihydropyran derivatives forms no part of this invention.

The following examples, tables and discussion are intended to further illustrate the practice of this invention but they are not to be construed as limiting the scope of this invention.

EXAMPLE I (A) Procedure for preparing alkyl tetrahydropyranylethers and aryl tetrahydropyranylethers One molar equivalent of an alcohol (or phenol) was mixed with one molar equivalent of dihydropyran in a suitable reaction container and stirred well. A trace of p-toluenesulfonic acid in chloroform solution was added to the mixture as a catalyst. The reaction of the alcohol (or phenol) with the dihydropyran usually yielded an immediate exotherm and in some cases it was necessary to control this exotherm below 70° C. by cooling the reaction container with a cold water bath. After about 1–5 minutes, maximum exotherm usually subsided. The reaction was allowed to continue for about 1 hour with continued stirring. The catalyst of the reaction was then killed by the addition of a lime paste or 1 N KOH solution and stirring for about 1 hour. The water in the reaction mixture was then usually absorbed by the addition of anhydrous sodium sulfate followed by filtration if a KOH solution was used or by filtering with 1% "Dicalite" (a diatomite material sold by Great Lakes Carbon Corporation) if lime paste was used. The filtrate was then stripped of any chloroform by placing the reaction container in a 60° C. water bath and applying about 27" vacuum. The

---

[1] Structurally modified acid—commercial mixture containing principally $C_{18}$ saturated fatty acids. U.S. Pat. 2,812,342.
[2] Dimer—commercial mixture containing mostly $C_{36}$ saturated dicarboxylic acid.
[3] Trimer—commercial mixture of $C_{54}$ tricarboxylic acid. (Monomer, dimer and trimer acids are commonly known in the art and their methods of preparation are referred to in U.S. Pat. 3,280,140.)
[4] Diphenolic acid—4,4-bis(hydroxy aryl) pentanoic acids as fully described in U.S. Pat. 2,933,520.

reaction was usually found to go to substantial completion. The remaining reaction products of tetrahydropyranyl ether were analyzed by infrared technique or thin layer chromatography to determine their structure and purity. Thin layer chromatography technique was done on silica gel plates using a solvent system of chloroform and benzene (55:45 volume ratio) and iodine vapor to develop the plate.

In certain cases it was found advantageous to use up to a 2 molar excess of dihydropyran to insure complete reaction. Excess dihydropyran was then removed from the reaction mixture in the same manner as the chloroform was removed.

(B) Procedure for preparing alkyl and aryl tetrahydropyranylesters

One molar equivalent of an aryl or alkyl carboxylic acid was mixed with two molar equivalents of dihydropyran in a suitable reaction container with gentle heating, if necessary, to give one phase. A trace of p-toluenesulfonic acid in chloroform was then added to the mixture with good stirring to catalyze the reaction. The reaction usually began immediately with an exotherm and maximum exotherm was usually observed after about 1–5 minutes. The temperature was held below 70° C. with a cold water bath, if necessary. The reaction was then allowed to continue for about 2–3 hours and the catalyst was thereafter killed by the addition of about 1% paste followed by filtration as in Example I(A). The filtrate was then stripped of excess dihydropyran by 27" vacuum distillation at about 65° C. The tetrahydropyranyl reaction product which remained was analyzed by acid value, infrared, and thin layer chromatography techniques in a manner similar to that described in Example I(A) for structure and purity determination.

(C) Procedure for preparing thio-dihydropyran derivatives

These derivatives were prepared using the technique described in Examples I(A) and I(B) for the tetrahydropyranylethers with the exception that alkyl and aryl thiols and thioacids were employed instead of the alcohol or phenol or acid.

(D) Preparation of polyesters, polyethers, or polyetheresters of tetrahydropyran from dihydropyran and polyfunctional acids, alcohols, phenols and/or acid-alcohols or phenols It is to be understood that the preparation of mono-, di and tri-adducts of dihydropyran and a polyfunctional reactant is a matter of stoichiometry and variation in reaction conditions. In general, the dihydropyran is preferably reacted in molar excess of its combining ratio of one part dihydropyran for each reactant group of the mentioned compounds to insure complete reaction when preparing the multi-adducts with dihydropyran.

However, mono-adducts of the polyfunctional compounds have been prepared. For example, the mono-"Bisphenol-A" adduct of dihydropyran was prepared by dissolving 144 grams of "Bisphenol-A" in 150 ml. acetone. 0.1 gm. of p-toluenesulfonic acid was added, followed by the addition of 42 grams of dihydropyran with stirring. Temperature went from 25° C. to 40° C. Stirring was continued for one hour and 3 gms. of lime in 5 ml. $H_2O$ was added and stirred in for 45 minutes and 3 gms. of "Dicalite" was added. This mixture was filtered and the acetone stripped off. The remaining oil was dissolved in ethyl ether and extracted 3 times with 50 ml. of 1 N KOH. The ether solution was then dried with anhydrous sodium sulfate and the ether stripped off by distillation. The remaining water-white oil was shown to be 95% pure 2[4-(4 - hydroxyphenylisopropylidene) phenoxy]tetrahydropyran by thin layer chromatography and confirmed by infrared spectrum analysis.

(E) Compounding of vinyl resin-tetrahydropyranyl derivative compositions and heat stability testing procedure Tetrahydropyranyl ethers and esters prepared according to the techniques described in Example I(A)–I(D) were compounded to produce stabilized vinyl halide resin compositions and tested for heat stability in the following manner:

The tetrahydropyranyl derivatives were mixed together with the vinyl resin, with or without suitable plasticizer additives. The mixture was then transferred to a rubber roll mill maintained at a temperature of about 350° F. to process the blend into sheet material. During this processing, the mixture was worked continuously for about 5 minutes after the sheet began to form. From the milled sheet, test sheets of about 20 mil in thickness were pressed in chrome-plated molds at about 345° F. The time and pressure cycle was 500 lbs. for two minutes and 1500 lbs. for 4 minutes. The sheets were then cut into ¾" x ¾" samples for evaluating heat stability.

Eight ¾" x ¾" test samples containing the tetrahydropyran derivative were mounted individually on stiff paper board and hung in a 350° F. rotating shelf oven. A control sample (blank) was run with each test. One test sample was removed every 15 minutes until all samples were removed (120 minutes). All samples were then examined visually to determine color change since this change is the principal indication of the extent of degradation in vinyl resin systems and is utilized to ascertain stabilizing efficiency. The results are recorded as the number of minutes to (1) first significant color change and (2) second significant color change or failure which usually is dark brown or black. These two times, i.e., first color change and second color change, represent the relative heat stability of the compounded vinyl halide resin sheet material. As used in the following examples, a reported heat stability of 15/30, for example, means that the first significant color change was observed after 15 minutes lapsed and the second color change or failure was observed after 30 minutes lapsed.

EXAMPLE II

This example demonstrates that a number of dihydropyran derivatives according to this invention are effective in stabilizing vinyl resin compositions. Various tetrahydropyranyl esters and ethers were prepared, compounded into films with vinyl halide resins and the films were tested according to Example I for heat stability. The results are reported in Table I. The term DHP is used in this and later tables as an abbreviation for dihydropyran and all ingredients are given in parts by weight. It is also to be understood that the derivatives of DHP listed are compounds resulting from the esterification or etherification of dihydropyran with the alcohol, acid, thio compound or phenol listed and the compounds conform to the formulas assigned above.

In general, Table I demonstrates that the addition of either an alkyloxy, aralkyleneoxy, alkylacyloxy, alkylthio or alkylenedi (aryloxy) group to the tetrahydropyran nucleus or nucleii provides a tetrahydropyranyl ether or ester which gives improved heat stability over a control. This stability was demonstrated by a late second color change or absence of a second color change. Also, as the amount of dihydropyran derivative is increased, the heat stability does not improve and in fact it appears from this data that it is beneficial to add a small amount of dihydropyran derivative, i.e., in the range of about 1–10 parts/100 parts of polyvinyl chloride resin. The dodecanethiol and Bisphenol-A derivative of dihydropyran gave superior results demonstrated by no failure or significant second color change after 120 minutes (120+=no color change after 120 min.).

Table II demonstrates that other plasticizers were employed with the dihydropyran derivatives without affecting their heat stability.

TABLE I

| | Hexadecyl alcohol | | | Methyl-phenyl carbinol | Stearic acid | | Dodecanethiol | | | Bisphenol-A[1] | | |
|---|---|---|---|---|---|---|---|---|---|---|---|---|
| Film composition: | | | | | | | | | | | | |
| "Geon 101"[2] | 100 | 100 | 100 | 100 | 100 | 100 | 100 | 100 | 100 | 100 | 100 | 100 |
| Dioctylphthalate | 50 | 50 | 50 | 47 | 50 | 50 | 50 | 50 | 50 | 50 | 50 | 50 |
| DHP derivative | 1 | 3 | 10 | 3 | 1 | 1 | 5 | 10 | 1 | 5 | 10 | |
| Heat stability[3] | 15/120 | 15/105 | 15/90 | 15/45 | 15/120 | 15/120+ | 15/90 | 15/90 | 15/120+ | 15/90 | 15/30 | |

[1] "Bisphenol-A" is a brand name for 4,4'-isopropylidenediphenol by The Dow Chemical Company; Bisphenol-A/DHP reaction product is 2[4-[4-(2-tetrahydropyranyloxy)-phenyl]isopropylidenephenoxy]tetrahydropyran unless otherwise specified in this description.
[2] "Geon 101" is a brand name for a polyvinyl chloride by B. F. Goodrich Chemical Company; also a copolymer of vinyl chloride and 13% vinyl acetate has been used in compositions similar to the above with similar results.
[3] The heat stability of a blank without DHP derivative was 15/30.

TABLE II

| | DHP derivative of— | | | |
|---|---|---|---|---|
| | Bisphenol-A | Octylphenol | Nonylphenol | Neodecanoic acid |
| Film composition: | | | | |
| "Geon 101" | 100 | 100 | 100 | 100 |
| 2-ethylhexylazelate | 45 | 45 | 45 | 45 |
| DHP derivative | 3 | 3 | 3 | 3 |
| Heat stability[1] | 15/120 | 15/120+ | 15/120+ | 15/120+ |

[1] The heat stability of a blank without DHP derivative was 15/45.

As discussed in the summary of this invention, the stabilizing derivatives of dihydropyran have been found capable of combination with other known stabilizers of the metallic soap types such as calcium oleate, lead stearate, zinc stearate, cadmium benzoate, cadmium oleate and the like with either some improvement over the use of a metallic soap stabilizer control or without affecting the expected stabilizing ability of the mixture.

However, it has been discovered that certain of the aryl tetrahydropyranyl ethers of this invention when employed with certain combinations of metallic cations of metal soaps provide a synergistic stabilizing effect. This is demonstrated by reference to Table III.

TABLE III

| | DHP derivative of— | | |
|---|---|---|---|
| | Octylphenol | Nonylphenol | Bisphenol-A |
| Film composition: | | | |
| "Geon 101" | 100 | 100 | 100 |
| Dioctylphthalate | 47 | 47 | 50 |
| Ba/Cd coconate[1] | 2 | 2 | 2 |
| DHP derivative | 3 | 3 | 3 |
| Heat stability[2] | 120+/120++ | 120+/120++ | 120+/120++ |

[1] Contains about 16% barium and 8% cadmium (67.5% Ba coconate, 37.3% Cd coconate).
[2] The heat stability for a blank without DHP derivative but with Ba/Cd coconate was 45/60.

When the results of Table III are compared with the blank of Ba/Cd coconate without dihydropyran derivative, it is demonstrated that the blank's first and second color changes occurred at 45/60. However, and surprisingly, the dihydropyran derivative and Ba/Cd coconate combined produced a stabilizing effect where no first or second color changes were noted after 120 minutes (significance of 120+/120++, as mentioned above). To appreciate the synergism here, the results of Tables I and II which give heat stabilities for each of the dihydropyran derivatives of Table III alone, at the same parts by weight must be considered. It is to be noted in Tables I and II that each of the octylphenol, nonylphenol and Bisphenol-A dihydropyran derivatives, alone, gave a first color change after about 15 minutes, but they do extend the period before the second color change occurs.

The synergism demonstrated in Table III is not peculiar to 2-octylphenoxytetrahydropyran, 2-nonylphenoxytetrahydropyran, or the mono and/or di-adduct of Bisphenol-A and dihydropyran. Other groups substituted on the dihydropyran nucleus have produced excellent synergism with Ba/Cd metallic cations such as those present in the material sold under the trademark Ferro 1820. For example, 2-(2,4,6 - trichlorophenoxy)tetrahydropyran, 2-(polyisobutylphenoxy)tetrahydropyran and 2-(o-methylphenoxy)tetrahydropyran have demonstrated synergistic activity with Ba/Cd cations at levels comparable to those listed in Table III.

It has also been determined that the range of ingredients for the derivatives of dihydropyran and Cd/Ba

TABLE IV

| | DHP derivative of— | | | | | | | |
|---|---|---|---|---|---|---|---|---|
| | Octylphenol | | Nonylphenol | | | Bisphenol-A | | |
| Film composition: | | | | | | | | |
| "Geon 101" | 100 | 100 | 100 | 100 | 100 | 100 | 100 | 100 |
| Dioctylphthalate | 47 | 25 | 47 | 5 | 50 | 50 | 50 | 50 |
| Ba/Cd coconate | 2 | 2 | 2 | 2 | 1.5 | 2 | 2 | |
| DHP derivative | 3 | 25 | 3 | 45 | 0.2 | 3 | 25 | |
| Heat stability | 120+/120++ | 120+/120++ | 120+/120++ | 120+/120++ | 120+/120++ | 120+/120++ | 120+/120++ | | cations listed in Table III can be varied without affecting the synergistic activity. Table IV demonstrates variation, for example, in amounts of dihydropyran derivative from about 0.2 to about 45 parts per 100 parts vinyl halide resin.

Another important aspect of the stabilized compositions according to this invention is their compatibility with plasticizing epoxy resins, particularly of the epoxidized fatty compounds mentioned, supra. The problem, as mentioned, heretofore with epoxy plasticizer compounds is that they react with hydrogen halide. Therefore, when the vinyl halide resin film containing epoxy compound is subjected to heat, the hydrogen halide released reacts with the epoxy compounds and incompatible by-products are formed which spew or exude from vinyl resin films.

Table V demonstrates that the tetrahydropyrans of this invention have the ability to function in the presence of epoxidized soya in a synergistic manner as shown by 2[4-(4 - hydroxyphenylisopropylidene)phenoxy]tetrahydropyran and 2[4-[4-(2-tetrahydropyranyloxy)-phenol] isopropylidenephenoxy]tetrahydropyran.

TABLE V

| Film composition: | | | | | | |
|---|---|---|---|---|---|---|
| "Geon 101" | 100 | 100 | 100 | 100 | 100 | 100 |
| Dioctylphthalate | 42 | 50 | 42 | 45 | 47 | 49 |
| Epoxy soya [1] | 8 | | 8 | 5 | 3 | 1 |
| DHP derivative of Bisphenol-A [2] | | 0.2 | 0.2 | 0.2 | 0.2 | 0.2 |
| Heat stability | 90/105 | 15/120+ | 120+/120++ | 120/120+ | 105/120+ | 90/120+ |
| Controls | A | B | | | | |

[1] Epoxidized soya bean oil.
[2] 2[4-[4-(2-tetrahydropyranyloxy)-phenyl] isopropylidenephenoxy] tetrahydropyran.

Many apparent different variations of the compositions of this invention can be made and equivalents substituted therefor without departing from the spirit and scope thereof, and it is to be understood that the invention is not limited to the specific examples herein described.

What is claimed is:

1. A heat stabile resin composition comprising a halogen-containing vinyl resin and from about 0.1 to 200 parts per 100 parts by weight of vinyl resin and a tetrahydropyranyl compound selected from the group consisting of (a) tetrahydropyranyl ethers of the formula

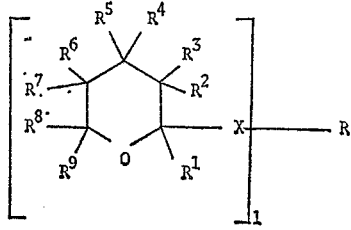

wherein X is a divalent oxygen or sulfur atom, $R^1$ to $R^9$ are hydrogen or lower alkyl group and R is a radical selected from the group consisting of alkyl, aryl, cycloalkyl, aralkyl, alkaryl, haloaryl, nitroaryl, alkoxyaryl and hydroxyaryl; (b) tetrahydropyranyl esters of the formula

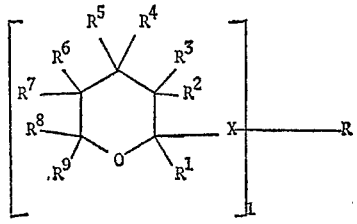

wherein X is a divalent oxygen or sulfur atom, $R^1$ to $R^9$ are hydrogen or lower alkyl group and R is a radical selected from the group consisting of alkylcarbonyl, alkenecarbonyl, arylcarbonyl, alkarylcarbonyl, aralkylcarbonyl, di(hydroxy)alkenylcarbonyl; (c) tetrahydropyranyl ethers of the formula

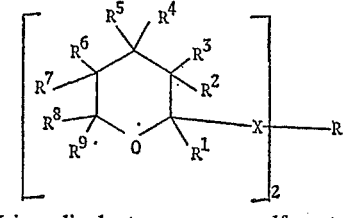

wherein X is a divalent oxygen or sulfur atom, $R^1$ to $R^9$ are hydrogen or lower alkyl group and R is selected from the group consisting of alkylene, alkylenediaryl and phenylene; (d) tetrahydropyranyl esters of the formula

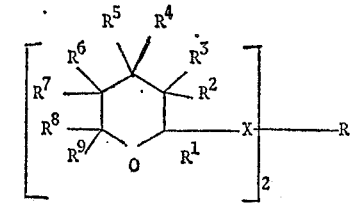

wherein X is a divalent oxygen or sulfur atom, $R^1$ to $R^9$ are hydrogen or lower alkyl group, and R is an alkylenedicarbonyl radical; (e) tetrahydropyranyl esters of the formula

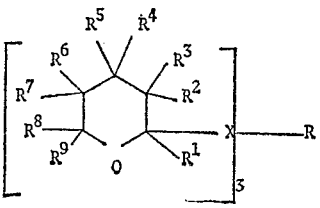

wherein X is a divalent oxygen or sulfur atom, $R^1$ to $R^9$ are hydrogen or lower alkyl group and R is an alkenyltricarbonyl radical; and (f) tetrahydropyranyl mixed ether-esters of the formula

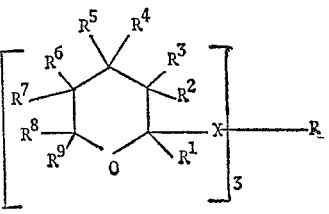

wherein X is a divalent oxygen or sulfur atom, $R^1$ to $R^9$ are hydrogen or lower alkyl group and R is a radical derived from 4,4-bis(hydroxy aryl) pentanoic acid.

2. The composition of claim 1 wherein said compound is present in an amount in the range of about 1 to 10 parts by weight of said resin.

3. The composition of claim 1 which further comprises a plasticizing amount of a plasticizer.

4. The composition of claim 3 wherein said plasticizer is an ester plasticizer.

5. The composition of claim 4 wherein said ester plasticizer is a polyester selected from the group consisting of polyesters of polybasic acids and polyols, diesters of dibasic acids and mono-alcohols, diesters of glycols and mono-basic acids, and triesters of tribasic acids and mono-alcohols.

6. The composition of claim 1 wherein $n$ is 1 and said compound is selected from the group consisting of 2-octylphenoxytetrahydropyran, 2-nonylphenoxytetrahydropyran, 2 - polyisobutylphenoxytetrahydropyran, 2-o-methylphenoxytetrahydropyran, and 2[4-(4 - hydroxyphenylisopropylidene)phenoxy]tetrahydropyran.

7. The composition of claim 6 further comprising a metallic soap containing barium and cadmium cations wherein said metallic soap is present in an amount of 1 to about 2 parts per 100 parts by weight of resin and said tetrahydropyran compound is present in an amount of about 0.1 to about 45 parts per 100 parts by weight of resin.

8. Composition of claim 6 further comprising an epoxidized fatty compound as an epoxidized stabilizer.

9. The composition of claim 8 wherein the tetrahydropyran compound is present in an amount of about 0.2 to 25 parts per 100 parts by weight of said resin and wherein said epoxidized fatty compound is present in an amount of about 1 to about 8 parts per 100 parts by weight of said resin.

10. The composition of claim 9 further comprising a metallic soap containing barium and cadmium in a ratio of barium to cadmium of about 2:1.

11. The composition of claim 1 wherein said compound is selected from the group consisting of dodecyl 2-tetrahydropyran sulfide and octyl 2-tetrahydropyran sulfide.

12. The composition of claim 1 wherein $n$ is 2 and said compound is 2[4-[4-(2-tetrahydropyranyloxy)-phenyl] isopropylidenephenoxy] tetrahydropyran.

13. The composition of claim 12 further comprising a metallic soap containing barium and cadmium cations wherein said metallic soap is present in an amount of 1 to about 2 parts per 100 parts by weight of resin and said tetrahydropyran compound is present in an amount of about 0.1 to about 45 parts by weight of resin.

14. The composition of claim 13 which further comprises a plasticizing amount of a plasticizer.

15. The composition of claim 14 wherein said plasticizer is a polyester selected from the group consisting of polyesters of polybasic acids and polyols, diesters of dibasic acids and mono-alcohols, diesters of glycols and mono-basic acids, and triesters of tribasic acids and mono-alcohols.

16. The composition of claim 11 further comprising an epoxidized fatty compound as an epoxidized stabilizer.

17. The composition of claim 16 further comprising a metallic soap containing barium and cadmium ions in a ratio of barium to cadmium of about 2:1 wherein said metallic soap is present in an amount of about 1 to about 2 parts per 100 parts by weight of said resin, and said tetrahydropyran is present in an amount of about 0.2 to about 25 parts per 100 parts by weight of resin.

References Cited
UNITED STATES PATENTS 3,223,660  12/1965  Pulver et al. _____ 260—23

DONALD E. CZAJA, Primary Examiner

D. J. BARRACK, Assistant Examiner

U.S. Cl. X.R.

260—31.6, 31.8 R, 45.7 S, 45.8 A